US011048432B2

(12) United States Patent
Shabi et al.

(10) Patent No.: US 11,048,432 B2
(45) Date of Patent: Jun. 29, 2021

(54) DEDUPLICATION OF DATA ON DISTRIBUTED STORAGE SYSTEM INVOLVING RECEIVING AND MODIFYING METADATA FROM LOCAL OBJECT STORE

(71) Applicant: EMC IP Holding Company LLC, Hopkinton, MA (US)

(72) Inventors: Uri Shabi, Tel Mond (IL); Ronen Gazit, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/599,490

(22) Filed: Oct. 11, 2019

(65) Prior Publication Data

US 2021/0109671 A1  Apr. 15, 2021

(51) Int. Cl.
*G06F 3/06* (2006.01)

(52) U.S. Cl.
CPC ............ *G06F 3/0653* (2013.01); *G06F 3/061* (2013.01); *G06F 3/0629* (2013.01); *G06F 3/0641* (2013.01); *G06F 3/0659* (2013.01); *G06F 3/0662* (2013.01); *G06F 3/0683* (2013.01)

(58) Field of Classification Search
CPC ...... G06F 3/0653; G06F 3/061; G06F 3/0629; G06F 3/0641; G06F 3/0659; G06F 3/0662; G06F 3/0683
See application file for complete search history.

(56) References Cited

U.S. PATENT DOCUMENTS

| 7,908,436 B1* | 3/2011 | Srinivasan ............ G06F 3/0641 711/114 |
| 8,209,506 B2* | 6/2012 | Yueh ..................... G06F 3/0608 711/162 |
| 10,021,218 B2* | 7/2018 | Kenchammana-Hosekote ............ G06F 12/0866 |
| 10,635,315 B1* | 4/2020 | Armangau ............. G06F 3/067 |
| 2016/0246799 A1* | 8/2016 | Constantinescu ... G06F 16/1748 |

* cited by examiner

*Primary Examiner* — Tammara R Peyton
(74) *Attorney, Agent, or Firm* — Daly, Crowley, Mofford & Durkee, LLP

(57) ABSTRACT

An aspect of performance optimization in a storage system environment includes providing a metadata structure that describes a storage space of a storage system. For each storage object of a plurality of storage objects, an aspect includes monitoring input/output (IO) patterns for IO operations conducted, monitoring deduplication characteristics of the storage object, and configuring local mapping layer parameters. An aspect further includes modifying local object metadata in the metadata structure as a function of the monitoring and the configuring.

20 Claims, 8 Drawing Sheets

DEDUPLICATION OF DATA ON DISTRIBUTED STORAGE SYSTEM INVOLVING RECEIVING AND MODIFYING METADATA FROM LOCAL OBJECT STORE

BACKGROUND

Data optimization techniques reduce system administration and storage overhead costs. One optimization technique is deduplication in which a system eliminates duplicate data across a file system to increase storage efficiency, transmission speed, and processing efficiency. Data sent to a storage system can be segmented in fixed- or varying-sized segments in which each segment may be identified by an identifier, such as a hash signature or hash of data. Once the identifier is generated it is used to determine if the data segment already exists in the system. If it does, it does not need to be stored again. While data deduplication techniques save on storage space, it can involve overhead costs such as increases in input/output (IO) access overhead.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

According to aspects of the disclosure, a method for performance optimization in a storage system is provided. The method includes providing a metadata structure that defines a storage space of the storage system. For each of a plurality of storage objects in the storage system, the method includes monitoring input/output (IO) patterns for IO operations conducted, monitoring deduplication characteristics of the storage object, and configuring local mapping layer parameters. The method further includes modifying local object metadata in the metadata structure based on results of the monitoring and the configuring.

According to aspects of the disclosure, a system for performance optimization in a storage system is provided. The system includes a memory comprising computer-executable instructions and a processor executing the computer-executable instructions, the computer-executable instructions when executed by the processor cause the processor to perform operations. The operations include providing a metadata structure that defines a storage space of the storage system. For each of a plurality of storage objects, the operations include monitoring input/output (IO) patterns for IO operations conducted, monitoring deduplication characteristics of the storage object, and configuring local mapping layer parameters. The operations also include modifying local object metadata in the metadata structure based on results of the monitoring and the configuring.

According to aspects of the disclosure, a computer program product for performance optimization in a storage system is provided. The computer program product is embodied on a non-transitory computer readable medium, the computer program product including instructions that, when executed by a computer, causes the computer to perform operations. The operations include providing a metadata structure that defines a storage space of the storage system. The metadata structures includes nodes that point to respective virtual logical address nodes, and the virtual logical address nodes point to physical storage nodes for storage objects residing in the storage system. For each of the storage objects, the operations include monitoring input/output (IO) patterns for IO operations conducted, monitoring deduplication characteristics of the storage object, and configuring local mapping layer parameters. The operations also include modifying local object metadata in the metadata structure as a function of the monitoring and the configuring.

BRIEF DESCRIPTION OF THE DRAWINGS

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Figure 1:
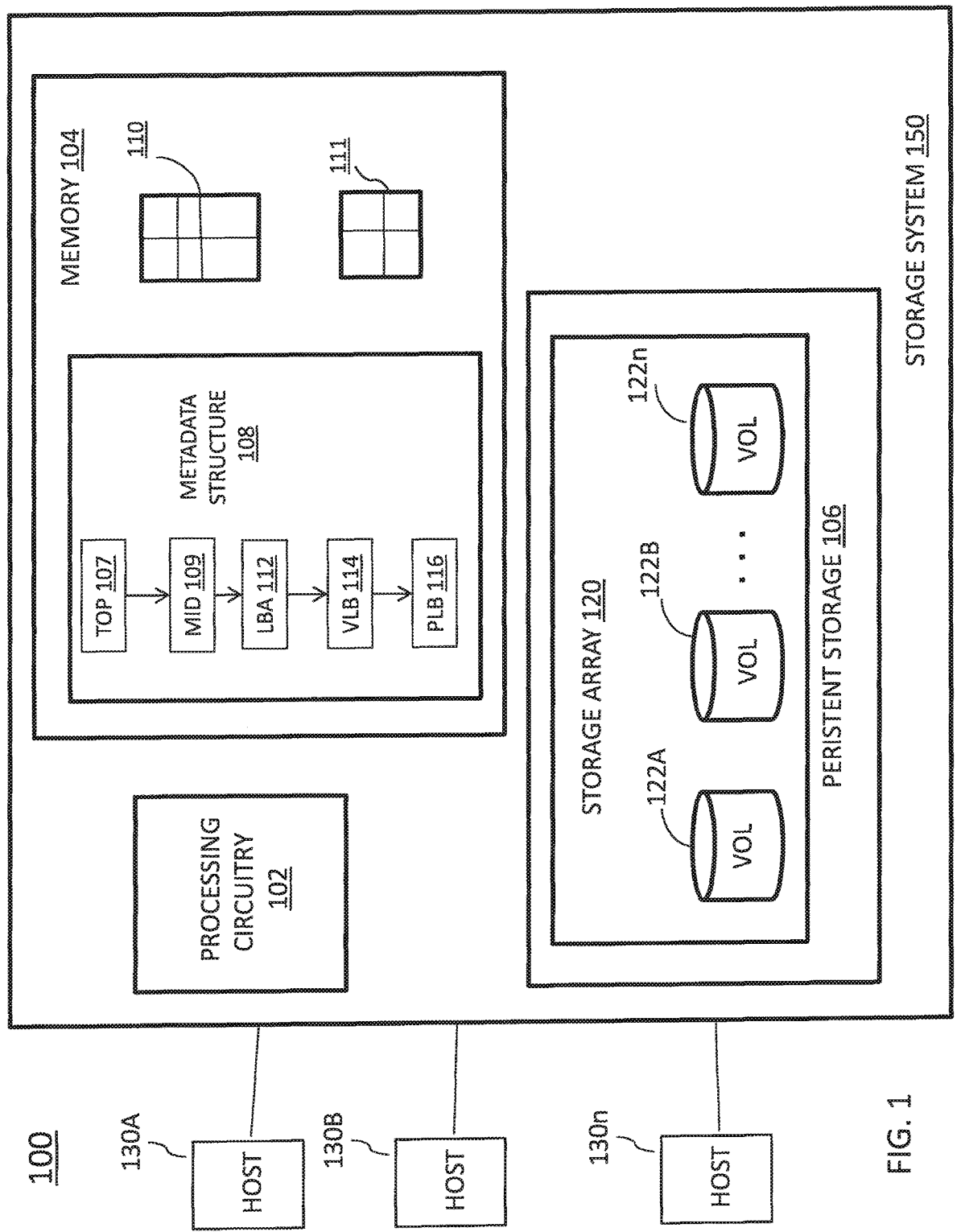
FIG. 1 is a diagram of an example of a storage system according to embodiments.

Before describing embodiments of the concepts, structures, and techniques sought to be protected herein, some terms are explained. The following description includes a number of terms for which the definitions are generally known in the art. However, the following glossary definitions are provided to clarify the subsequent description and may be helpful in understanding the specification and claims.

As used herein, the term "storage system" is intended to be broadly construed so as to encompass, for example, private or public cloud computing systems for storing data as well as systems for storing data comprising virtual infrastructure and those not comprising virtual infrastructure. As used herein, the terms "client," "host," and "user" refer, interchangeably, to any person, system, or other entity that uses a storage system to read/write data, as well as issue requests for configuration of storage units in the storage system. In some embodiments, the term "storage device" may also refer to a storage array including multiple storage devices. In certain embodiments, a storage medium may refer to one or more storage mediums such as a hard drive, a combination of hard drives, flash storage, combinations of flash storage, combinations of hard drives, flash, and other storage devices, and other types and combinations of computer readable storage mediums including those yet to be conceived. A storage medium may also refer both physical and logical storage mediums and may include multiple level of virtual to physical mappings and may be or include an image or disk image. A storage medium may be computer-readable, and may also be referred to herein as a computer-readable program medium. Also, a storage unit may refer to any unit of storage including those described above with respect to the storage devices, as well as including storage volumes, logical drives, containers, or any unit of storage exposed to a client or application. A storage volume may be a logical unit of storage that is independently identifiable and addressable by a storage system.

In certain embodiments, the term "IO request" or simply "IO" may be used to refer to an input or output request, such as a data read or data write request or a request to configure and/or update a storage unit feature. A feature may refer to any service configurable for the storage system.

In certain embodiments, a storage device may refer to any non-volatile memory (NVM) device, including hard disk drives (HDDs), solid state drivers (SSDs), flash devices (e.g., NAND flash devices), and similar devices that may be accessed locally and/or remotely (e.g., via a storage attached network (SAN) (also referred to herein as storage array network (SAN)).

In certain embodiments, a storage array (sometimes referred to as a disk array) may refer to a data storage system that is used for block-based, file-based or object storage, where storage arrays can include, for example, dedicated storage hardware that contains spinning hard disk drives (HDDs), solid-state disk drives, and/or all-flash drives. Flash, as is understood, is a solid-state (SS) random access media type that can read any address range with no latency penalty, in comparison to a hard disk drive (HDD) which has physical moving components which require relocation when reading from different address ranges and thus significantly increasing the latency for random IO data.

In certain embodiments, a data storage entity and/or storage unit may be any one or more of a file system, object storage, a virtualized device, a logical unit, a logical unit number, a logical volume, a logical device, a physical device, and/or a storage medium.

In certain embodiments, a logical unit (LU) may be a logical entity provided by a storage system for accessing data from the storage system, and as used herein a logical unit is used interchangeably with a logical volume. In many embodiments herein, a LU or LUN (logical unit number) may be used interchangeable for each other. In certain embodiments, a LUN may be a logical unit number for identifying a logical unit; may also refer to one or more virtual disks or virtual LUNs, which may correspond to one or more Virtual Machines. In certain embodiments, a volume refers to a unit of storage on a disk.

In certain embodiments, a storage cluster may refer to a type of configuration that enables stretched clusters (e.g., clusters distributed across different geographic locations). Storage cluster configurations enable entities to provide load balancing and migrations between data centers.

In certain embodiments, Log Structured Storage (LSS) refers to a file system in which data and metadata are written sequentially to a circular buffer, called a log. Log-structured file systems reclaim free space from the tail of the log to prevent the file system from becoming full when the head of the log wraps around to meet it. The tail can release space and move forward by skipping over data for which newer versions exist farther ahead in the log. If there are no newer versions, then the data is moved and appended to the head.

In certain embodiments, a Data Reduction Ratio (DRR) is a measure of the effectiveness of data reduction. DRR reflects the ratio of the size of data ingested to the size of the data stored. The size of stored data may be the amount of usable storage capacity consumed by the data.

While vendor-specific terminology may be used herein to facilitate understanding, it is understood that the concepts, techniques, and structures sought to be protected herein are not limited to use with any specific commercial products. In addition, to ensure clarity in the disclosure, well-understood methods, procedures, circuits, components, and products are not described in detail herein.

The phrases, "such as," "for example," "e.g.," "exemplary," and variants thereof, are used herein to describe non-limiting embodiments and are used herein to mean "serving as an example, instance, or illustration." Any embodiments herein described via these phrases and/or variants are not necessarily to be construed as preferred or advantageous over other embodiments and/or to exclude the incorporation of features from other embodiments. In addition, the word "optionally" is used herein to mean that a feature or process, etc., is provided in some embodiments and not provided in other embodiments." Any particular embodiment of the invention may include a plurality of "optional" features unless such features conflict.

Modern log structured (LSS) storage systems implement a mapping layer which is responsible for mapping between storage objects, such as volumes and their logical addresses within a low level type storage space (e.g., logical block address (LBA)) and the physical locations (e.g., high level type storage space (e.g., physical logical block PLB)) where the actual physical data is maintained.

Host applications, represented by the storage objects, may vary in many forms, such as native block size (e.g., ranging from 4 to 32K Bytes), page alignment, and dedupe pattern which may be at the native block size or may appear in smaller block sizes (e.g., saving dedupe in a smaller block size means that there is no dedupe for the native block size, while there exists a dedupe for a smaller block size, e.g., native block size is 32 Kbyte and a common dedupe is for 8 Kbytes blocks).

There are many variations in storage objects. With respect to write operations, variations include: common block size, common block alignment, minimal block size, and hot/cold data. With respect to read operations, variations include, e.g., common block size, common block alignment, and minimal block size. With respect to deduplication operations, variations include dedupe exist, common dedupe block size, and common dedupe alignment. This extension list of variations can be problematic in terms of designing a metadata mapping that is optimized for every variation.

One way to handle this involves designing for a worst case scenario (e.g., 4 KB block) where the system incurs excessive metadata costs but saves on additional deduplication and excessive read-modify-writes for 4 KB blocks and larger. Another way to handle this involves designing for the best case scenario (e.g., 32K) where the system saves significantly on metadata costs (almost 8× better than the 4K scenario), but a high toll is paid in excessive read-modify-writes on less than 32K (which can be very common in certain setups), and in reduced dedupe. Further, even the worst case scenario and the best case scenario still faces the alignment issue; that is, where host input/outputs (IOs) may not be aligned with the storage page alignment.

Other options can include a hybrid of 32K block granular metadata with 4K granular hashes for dedupe. The above are effective heuristics which provide good results in some host application scenarios but are suboptimal in others.

When a mapping layer is analyzed, factors that can be considered include the percentage of metadata required to represent user data, the read performance, write-modify scenarios, and the DRR (data reduction ratio).

Pre-configuration of storage object attributes is usually not possible, as in many cases it is not possible to know in advance what the configuration of the host application is, as it may change over time, or be related to virtualization hierarchy, etc.

In the embodiments described herein, a technique is provided that monitors the host application represented as storage objects, and accordingly adapts the local (per storage object) mapping layer metadata configuration to optimize in accordance with the host application parameters. In doing so, a near optimal configuration can be achieved to realize the most effective combination of read and write performance, read and write amplification ratio, metadata overhead and data-reduction ratio, and to make this optimization a per storage object as opposed to a global and single optimization, thus, achieving optimal results. In addition, the embodiments provide a way to dynamically transition from one local configuration to another local configuration as the host application usage parameters shift with time.

Turning now to FIG. 1, a system 100 for performance optimization and metadata reduction in a storage system environment will now be described in accordance with embodiments. The system 100 of FIG. 1 includes a storage system 150 and a plurality of hosts 130A-130n communicatively coupled to the storage system 150 via any type of communication technology, such as Internet, wireless area networks, local area networks, directly cabling (e.g., if residing local to the storage system 150), and may include wireless and/or wireline technology. The hosts may be implemented as hardware devices, clients, applications, etc. The hosts send requests to the storage system 150, which are processed by the storage system. The storage system 150 in turn includes processing circuitry 102, memory 104, and persistent storage 106. In an embodiment, the persistent storage 106 may be locally installed within the storage system 150, as shown in FIG. 1, or may be an external or remote device that is communicatively coupled to the storage system 150 via a connection (not shown).

If the persistent storage 106 is remote, it may be coupled to the storage system via known connections, interfaces and network circuitry, e.g., Ethernet cables, Wireless Fidelity (Wi-Fi) wireless connections, an IP network, SCSI cables, SATA cables, Fibre Channel (FC) cables, etc. If the connection is a network connection, then interfaces and network circuitry may include, for example, one or more Ethernet cards, cellular modems, FC adapters, Wi-Fi wireless networking adapters, and/or other devices for connecting to a network. If the connection to the persistent storage is a local storage connection, then interface and/or network interface circuitry may include for example, SCSI, SAS, ATA, SATA, FC, and/or other similar controllers and ports.

The persistent storage 106 may include any kind of persistent storage devices, such as, for example, hard disk drives, solid-state storage devices, flash drives, etc. Persistent storage 106 stores user data as volumes 122A-122n, which represents one or more logical disks accessible by users. Volumes 122A-122n are organized and managed with reference to metadata that is stored within various data structures, such as metadata structure 108 in memory 104. The metadata structure 108 includes a mapping among layers of storage. As shown in FIG. 1, the data structure 108 includes atop node 107, mid-level nodes 109, leaf nodes 112, virtual nodes (e.g., VLBs) 114, and physical storage (e.g., PLBs) 116.

As shown in FIG. 1, by way of non-limiting example, the persistent storage is implemented via a storage array 120. While the unit of data storage is described herein as volumes in a storage array, it is understood that other units of data storage or object storage may be employed to realize the advantages of the embodiments.

The memory 104 also stores an index 110 for tracking metadata corresponding to blocks subject to compression. A hash table 111 is provided in the memory 104. The hash table 111 contains hashed values of data (e.g., stored as blocks) in the system. For each new unit of data (e.g., page or block), a lookup for a match is performed via the hash table.

The memory 104 may be any kind of digital system memory, such as, for example, random access memory (RAM). Memory 104 stores an operating system (OS, not depicted) in operation (e.g., a Linux, UNIX, Windows, MacOS, or similar operating system). Memory 104 may also store an input/output (I/O) stack in operation (not shown). The I/O stack allows I/O requests (not depicted) from external hosts (as well as local applications) to be processed with respect to the volume data 122A-122n managed by the storage system 150.

The storage system includes processing circuitry 102, which may be any kind of processor or set of processors configured to perform operations, such as, for example, a microprocessor, a multi-core microprocessor, a digital signal processor, a system on a chip, a collection of electronic circuits, a similar kind of controller, or any combination of the above. It will be understood that the storage system 150 may also include other components as are well-known in the art, including interconnection circuitry. In operation, the processing circuitry 102 may execute one or more application, which may be implemented in logic executable by the processing circuitry.

The processing circuitry 102 is configured to receive and service input/output (IO) requests from one or more external or remote systems (not shown) that are communicatively coupled to the storage system 150. The coupling may be implemented via any type of communication network, such as Internet, local area network, wide area network, and may include wireline and/or wireless technology.

The volumes 122A-122n may be addressable via a logical address that is mapped to a physical address of the array through a three level of indirection scheme that is used to perform address translation during read and write operations with respect to the array.

Partial page deduplication techniques utilize Log Structured Storage (LSS) system having a three-level indirection scheme with respect to storage addressing and is used translate or map (e.g., as a mapper) between layers of storage space: (i) low-level mappings (leaves) that contain pointers to data, (ii) mid-level mappings that contain pointers to the low-level mappings, and (iii) top-level mappings contain pointers to the mid-level mappings. The low level can be logical block address space (LBA), the mid level can be virtual block address space (VLB), and the top level can be physical address space (PLB). Each of these address spaces reflect a range of addresses. The mapping can be implemented using a data structure that takes a logical address and uses a pointer to point to a VLB address, which in turn points to a physical address (PLB) in which certain data (e.g., such as a page) resides. In log-structured storage systems, the data is stored in contiguous chunks of data, which is referred to as PLB (e.g., 2 MB chunks). The actual user data pages reside inside the PLB and are referenced by the VLB.

The VLB layer is particularly useful in cases of deduplication where a certain page is duplicated multiple times across the logical space (within a single or multiple volumes). In such a case, a single VLB entry is pointed to by multiple logical addresses, as it represents a single page on disk, deduplication for the page is not performed.

Deduplication may be implemented using a unique hash representing a page. The system 150 of FIG. 1 includes a deduplication index 110 in memory 104 that represents most hashes (which in turn represent most unique capacity of the cluster of volumes.

A partial page match occurs when a subpage (e.g., few sectors of the page) match as between two pages (e.g., part of the page are unique and part of the pages are in common).

Figure 2:
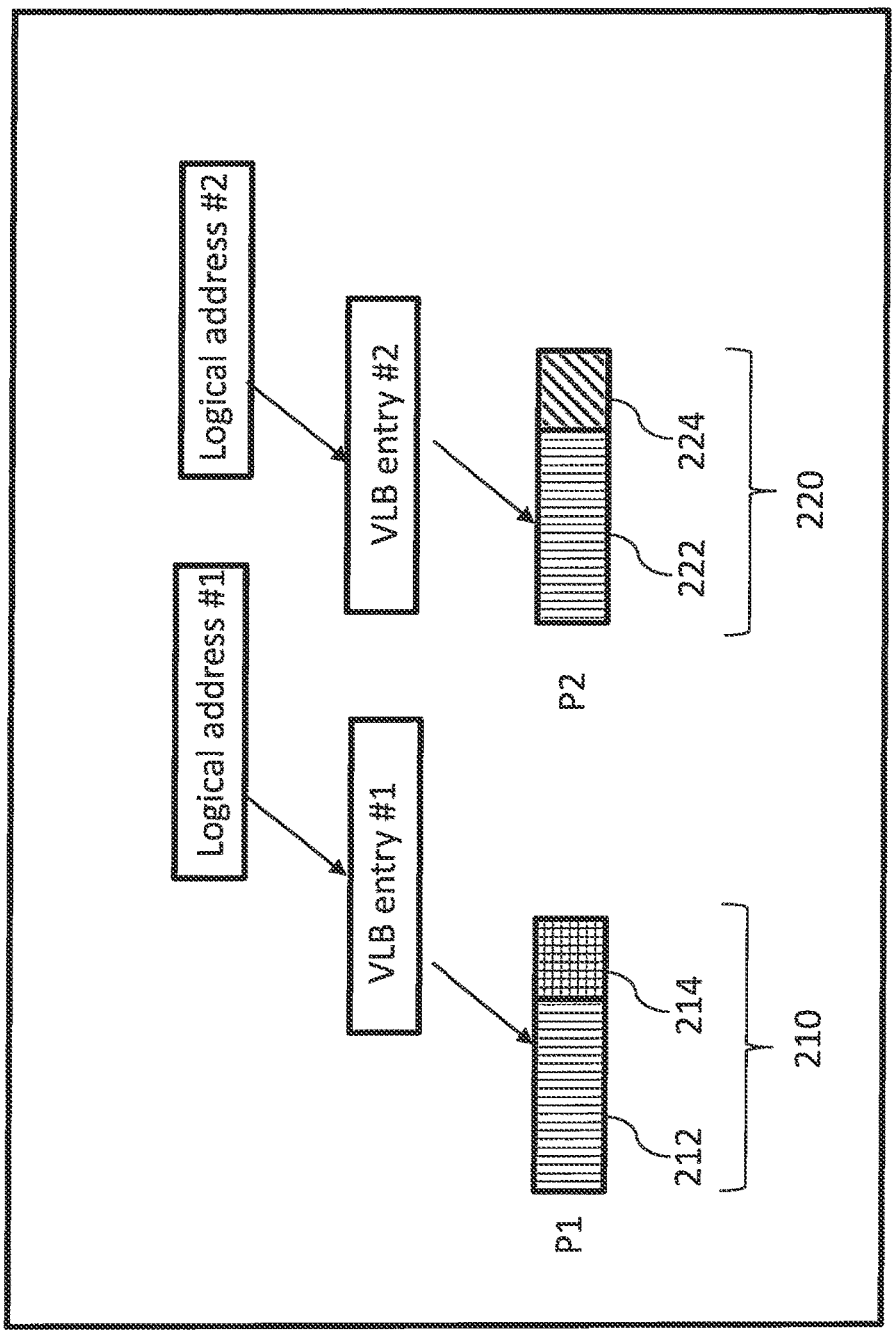
FIG. 2 is a diagram depicting an example metadata data structure.

As an example, logical representation of metadata in a data structure 200 for two partial matching pages (P1 and P2, 210 and 220, respectively) in a cluster for which full page deduplication is performed is shown in FIG. 2. The data structure 200 corresponds to the data structure 108 of FIG. 1. As shown in FIG. 2, the two pages P1 and P2 are maintained separately of one another (i.e., no common part of the pages are maintained by the system). The common part of the pages (i.e., representing duplicate data) is shown as 212 and 222. The page P1 also contains data 214 which is not in common with P2. Likewise, the page P2 contains data 224 that is not in common with page P1. Thus, the data stored in part of the page P1 (214) is not a duplicate of the part of the data stored in P2 (224). In the metadata structure 200 of FIG. 2, for page P1 (210), a logical address #1 for the page points to a VLB entry #1, which in turns points to the page P1. Also in the metadata structure 200 of FIG. 2, for page P2 (220), a logical address #2 for the page points to a VLB entry #2, which in turn points to the page P2.

As indicated above, the embodiments provide a technique that monitors the host application represented as storage objects, and accordingly adapts the local (per storage object) mapping layer metadata configuration to optimize in accordance with the host application parameters. In doing so, a near optimal configuration can be achieved to realize the most effective combination of read and write performance, read and write amplification ratio, metadata overhead and data-reduction ratio, and to make this optimization a per storage object as opposed to a global and single optimization, thus, achieving optimal results. In addition, the embodiments provide a way to dynamically transition from one local configuration to another local configuration as the host application usage parameters shift with time.

Figure 3:
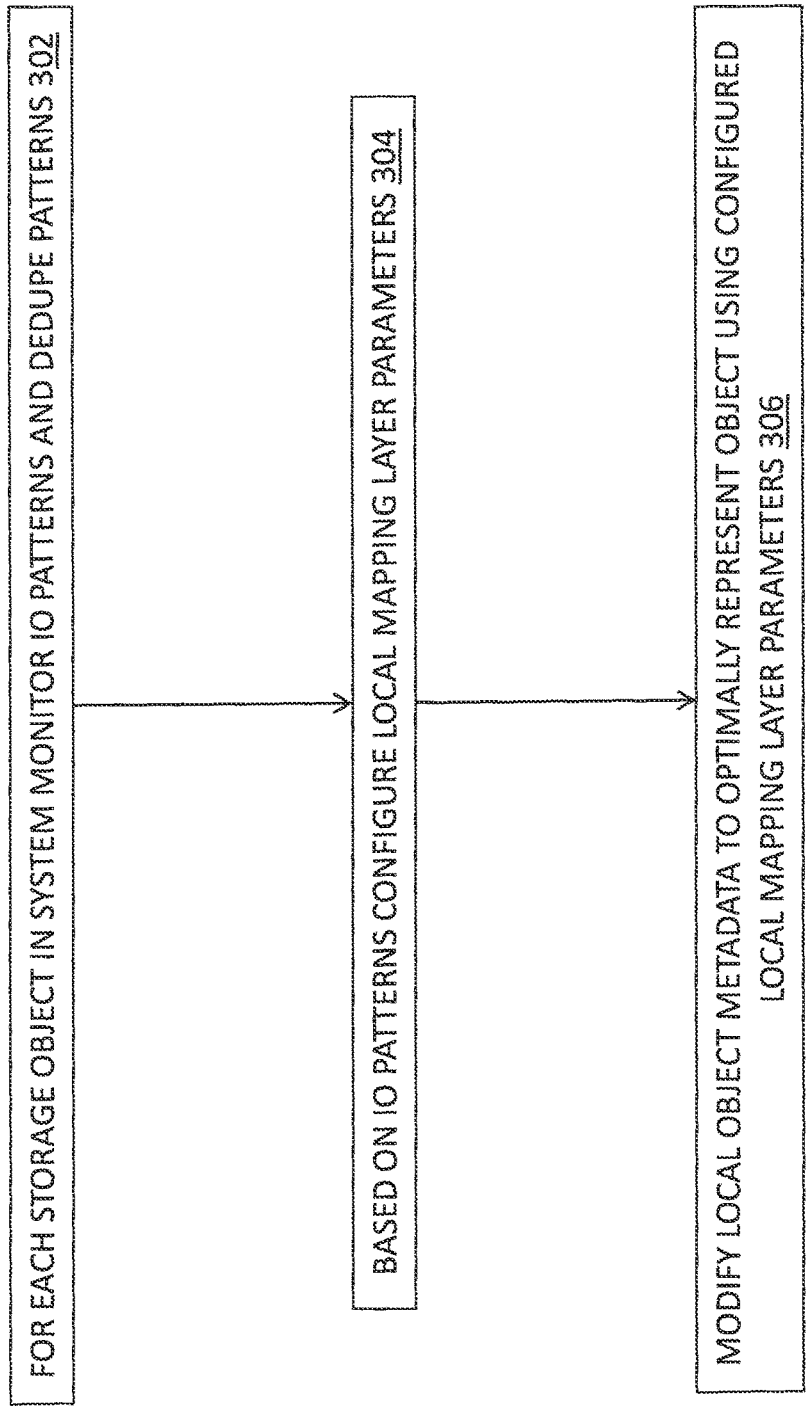
FIG. 3 is a flow diagram depicting a process according to embodiments.

Turning now to FIG. 3, a flow diagram of a process 300 for performance optimization and metadata reduction in a storage system environment will now be described. The process 300 performs object statistics monitoring and adapts local mapping layer parameters to the object statistics. In block 302, for each storage object (e.g., volume, LUN, virtual volume, sub-volume, file system), the process 300 monitors IO patterns conducted thereon (e.g., reads, writes, block sizes, alignments, etc.), as well as dedupe characteristics (e.g., data deduplication sizes). In block 304, based on these IO patterns, the process configures local mapping layer parameters. The mapping layer parameters configured may include an optimal block size (e.g., 4-32K), object alignment (e.g., at the sector granularity versus the storage system alignment), and the optimal dedupe granularity, to name a few.

In block 306, the process 300 modifies local object metadata as a function of the monitoring and configuration to best represent this object using the configured local mapping layer parameters.

Figure 4:
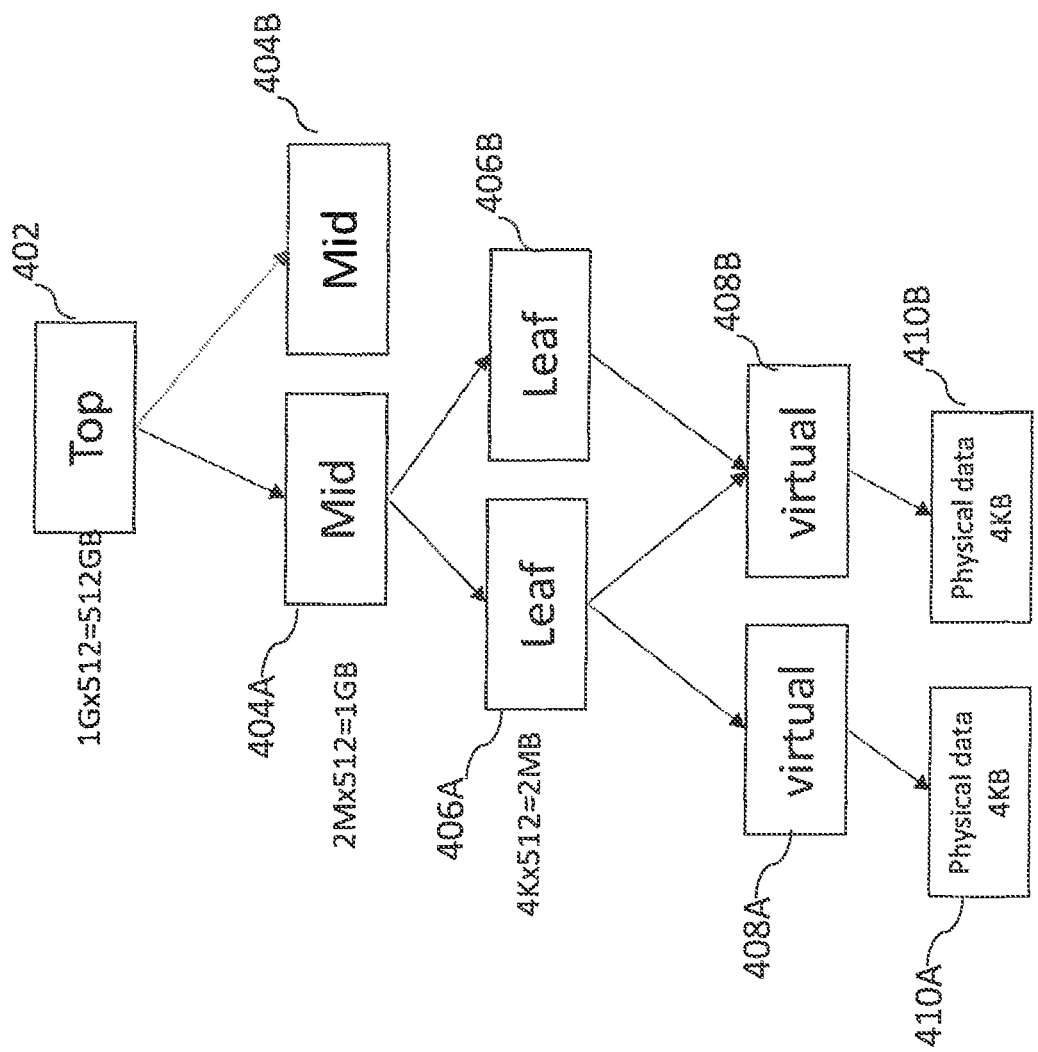
FIGS. 4-6 are diagrams depicting metadata structures according to embodiments.

As shown in FIG. 4, by way of a non-limiting example, consider a three-level mapping layer (with a top node, middle level nodes, and low level leaf nodes) and a virtual layer (virtual logical block (VLB)), where the mapper is initially configured to map blocks in a resolution of 4K pages each. The metadata for the structure 400 includes: a single top node 402 representing 512 GB of raw capacity, mid-level nodes 404A and 404B representing 1 GB of capacity in total, and each of leaf nodes 406A-406B representing 2 MB of capacity in total. In turn, each leaf entry (512 within a leaf node) points to a single VLB 408A-408B, respectively, which is a representation of 4K unique data in the physical storage (PLBs 410A-410B. This is an optimal representation where data is read and written in 4K blocks and also dedupe is in chunks of 4K.

Assume, e.g., that the object is monitored and it is concluded that read/write blocks are 32K and dedupe is mostly on 32K chunks. In this case, the following mapping is much more optimized (8× smaller without increasing read-modify-write as host application is accessing in 32 KB).

Figure 5:
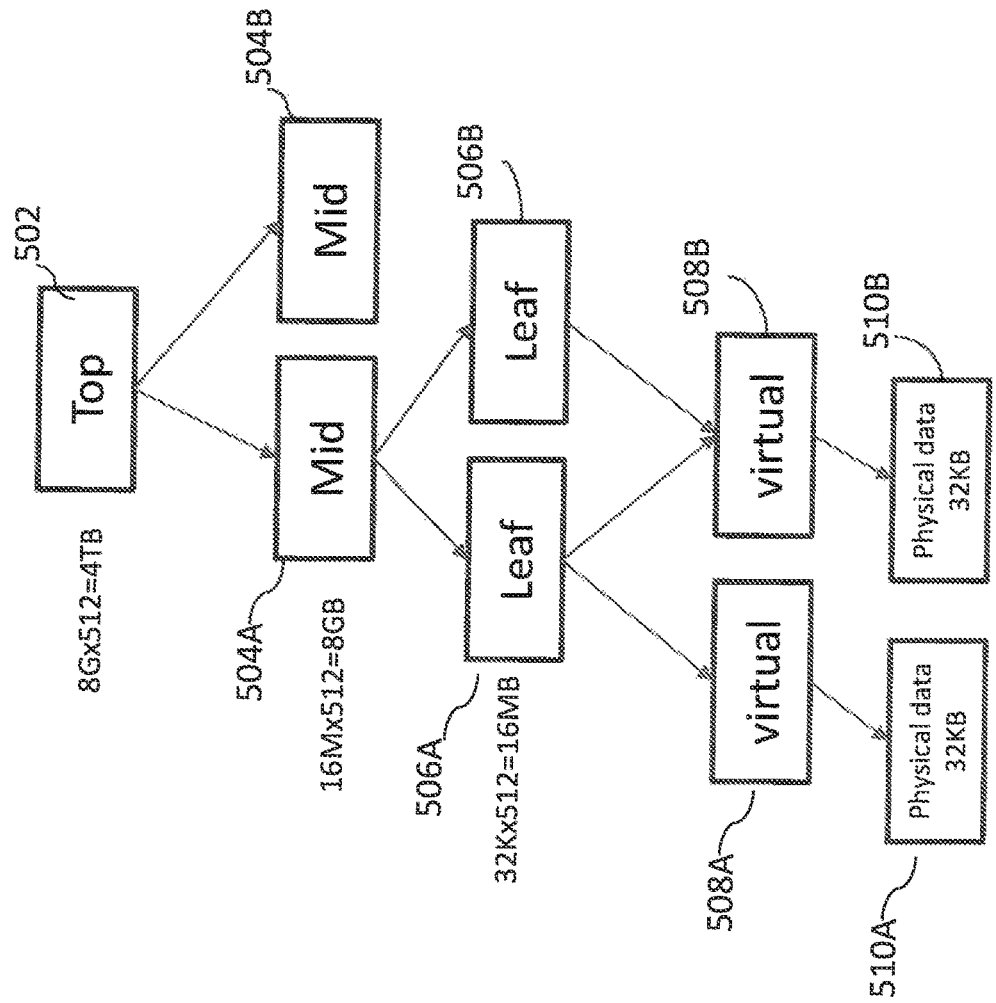

As shown in FIG. 5, by way of non-limiting example, a metadata structure 500 includes a single top node 502 representing 4 TB of raw capacity, mid-level nodes 504A-504B representing 8 GB of capacity, and each leaf node 506A-506B represents 16 MB of capacity. In turn, each leaf entry (512 within a leaf node), points to a single VLB 508A-508B, respectively, which is a representation of 32K unique data in the physical storage (PLBs 510A, 510B).

As can be seen, the number of leaves 506 and VLBs 508 (which are most of meta-data), is reduced by a factor of 8. This has many significant advantages. For example, an advantage includes reduced metadata footprint which can improve physical utilization, in-memory cache utilization, and write amplification, improved read operations as a result of less metadata and sequential user data. As another advantage, dedupe indexes would work at 32K granularity and will get a smaller factor.

Figure 6:
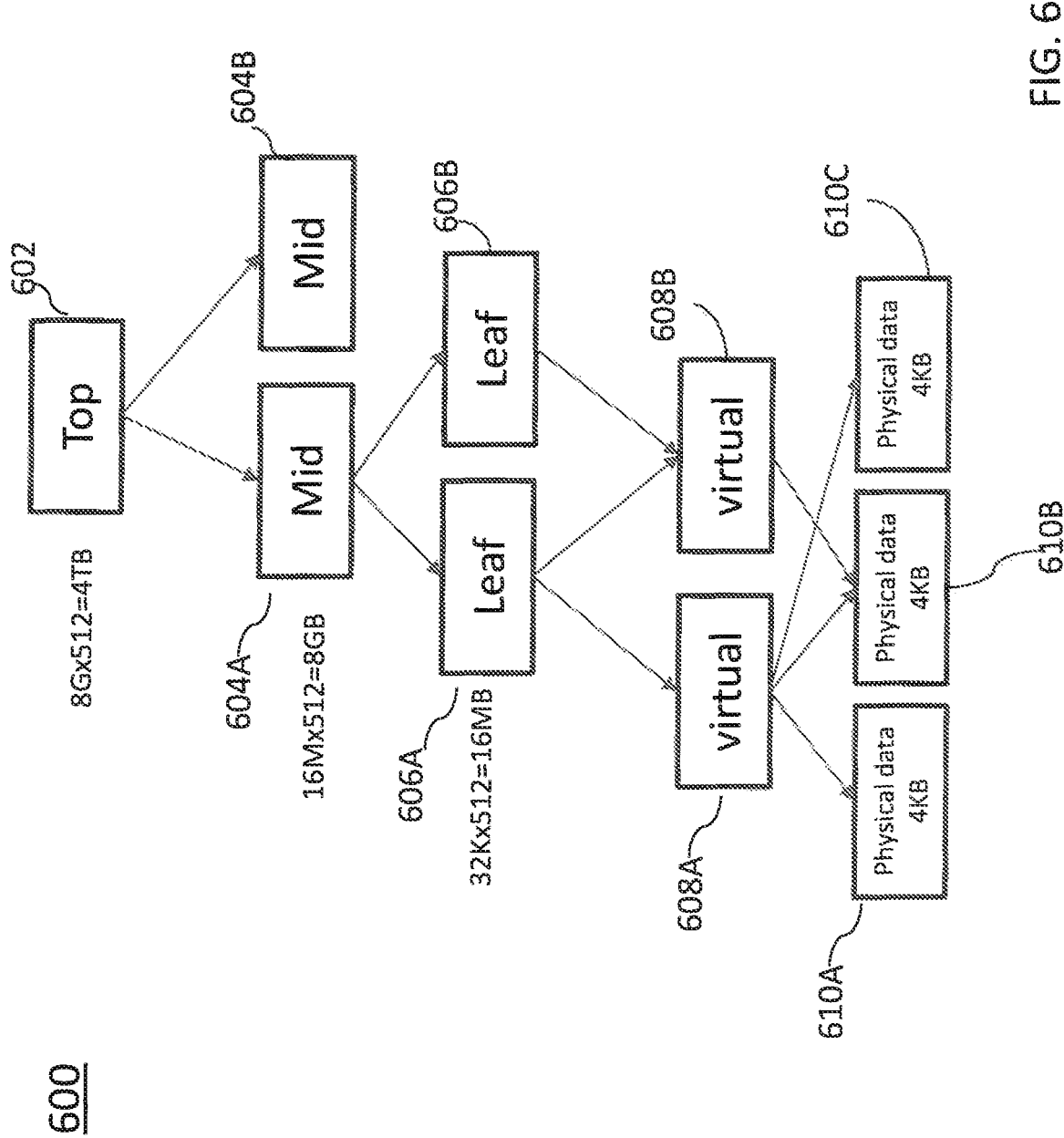

In another scenario, as shown in metadata structure 600 of FIG. 6, another conclusion may turn into read/write blocks are 32K but dedupe is mostly on 4 KB chunks. In this case, the following mapping is optimized to about 4× smaller which keeps read-modify-writes low as the user is accessing in 32 KB but it enables efficient 4 KB dedupe.

This mapping (e.g., of 602, 604A-604B, 606A-606B, 608A-608B) is similar to the previous mapping in top-, mid-, and leaf-levels of FIG. 5 but to maintain 4 KB dedupe, the 8 virtual per 32 KB leaf entry is kept (similar to keeping 4 KB blocks in the physical layer (PLBs 610A, 610B, 610C) while logical layer (mapper) is in higher granularity of 32 KB).

Dynamic and Local Metadata Configuration Transitioning

Adopting a metadata configuration is a delicate process that needs to happen in the background while a storage system is in use. One benefit is a reduction in metadata overhead while improving the response time of the storage array.

Figure 7:
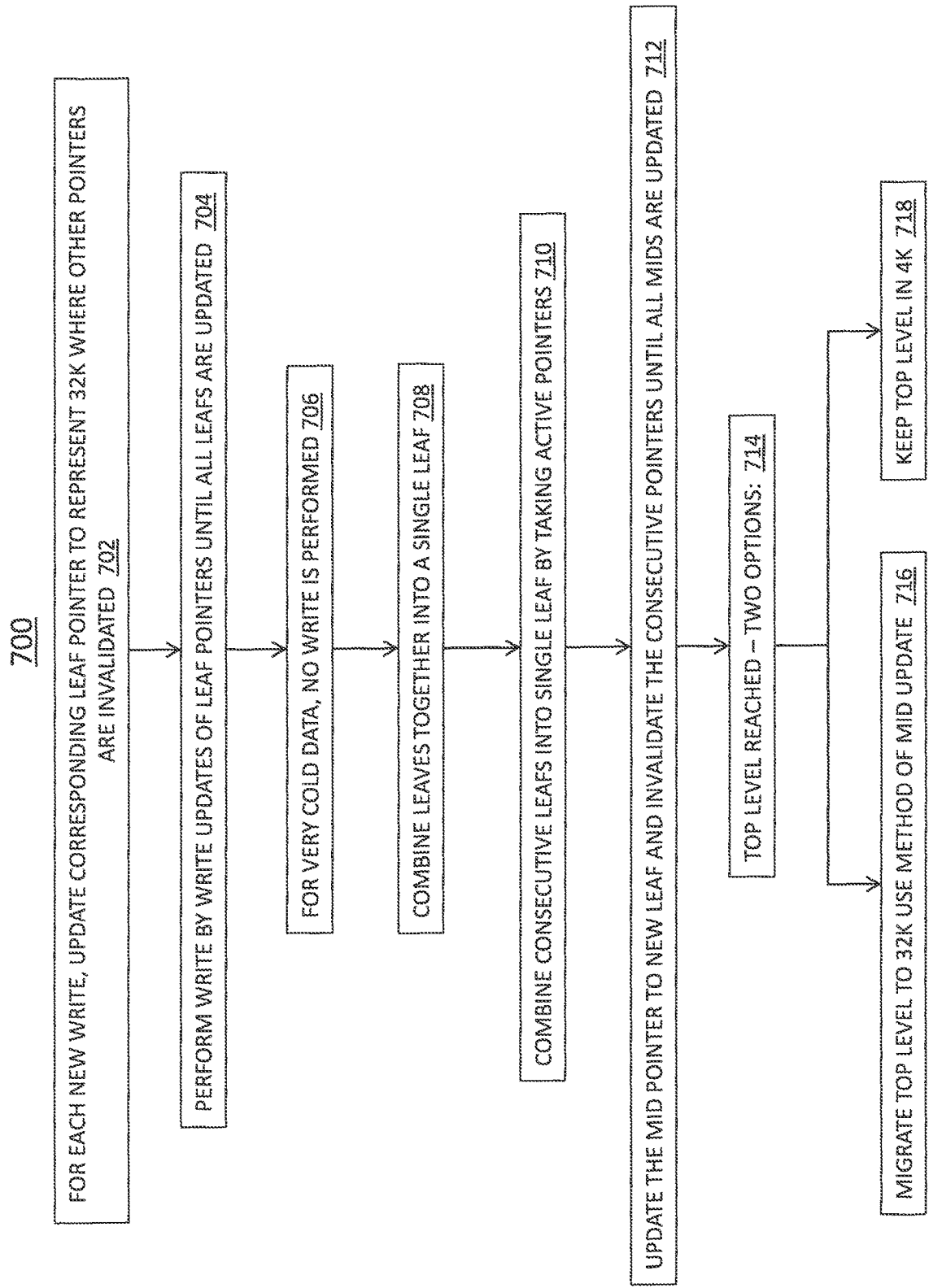
FIG. 7 is a flowchart of a process according to embodiments.

Turning now to FIG. 7, a process 700 for performance optimization and metadata reduction in a storage system environment will now be described in embodiments. The process 700 describes an example of moving from a 4K leaf into a 32K leaf (this example corresponds to the above referenced structure). In this example, a particular metadata structure consisting of top-mid-leaf levels is provided; however, it will be understood by those skilled in the art that other metadata constructions may be implemented in order to realize the advantages of the embodiments described herein.

Starting from the leaf, there are 512 pointers per leaf where each pointer represents 4K. To migrate a leaf, the goal is to modify the leaf to contain 64 pointers representing 32K each. In both cases the leaf represents 2 MB of data.

In block 702, for each new write, the process 700 updates the corresponding leaf pointer to represent 32K where other consecutive 7 pointers are invalidated. In block 704, the process 700 performs write by write updates of the leaf pointers until all leafs are updated. Once all leafs (for a given mid level, MID) are updated, in block 706, for very cold data no write is performed. Instead, the process 700 lazily modifies leaf pointers to represent 32K. In block 708, as all leafs within a single MID are updated, the process combines 8 leaves together into a single leaf (recall each leaf has a single 32K pointer and 7 are invalid). In block 710, the process 700 combines 8 consecutive leaves into a single leaf. The combining is performed by taking the active pointers (⅛ of them). In bock 712, the process 700 updates the MID pointer to the new leaf and invalidates consecutive 7 pointers. This continues until all MIDs are updated. In block 714, the top level is reached. When reaching the top level there are two options. In block 716, one option is to migrate the top level to 32K using the same method as the MID update. Alternatively, another option in block 718 is to keep the top level in 4K, as top level is very small in terms of metadata. At this point all mapper metadata is adopted and optimized to volume 32K read and write.

Figure 8:
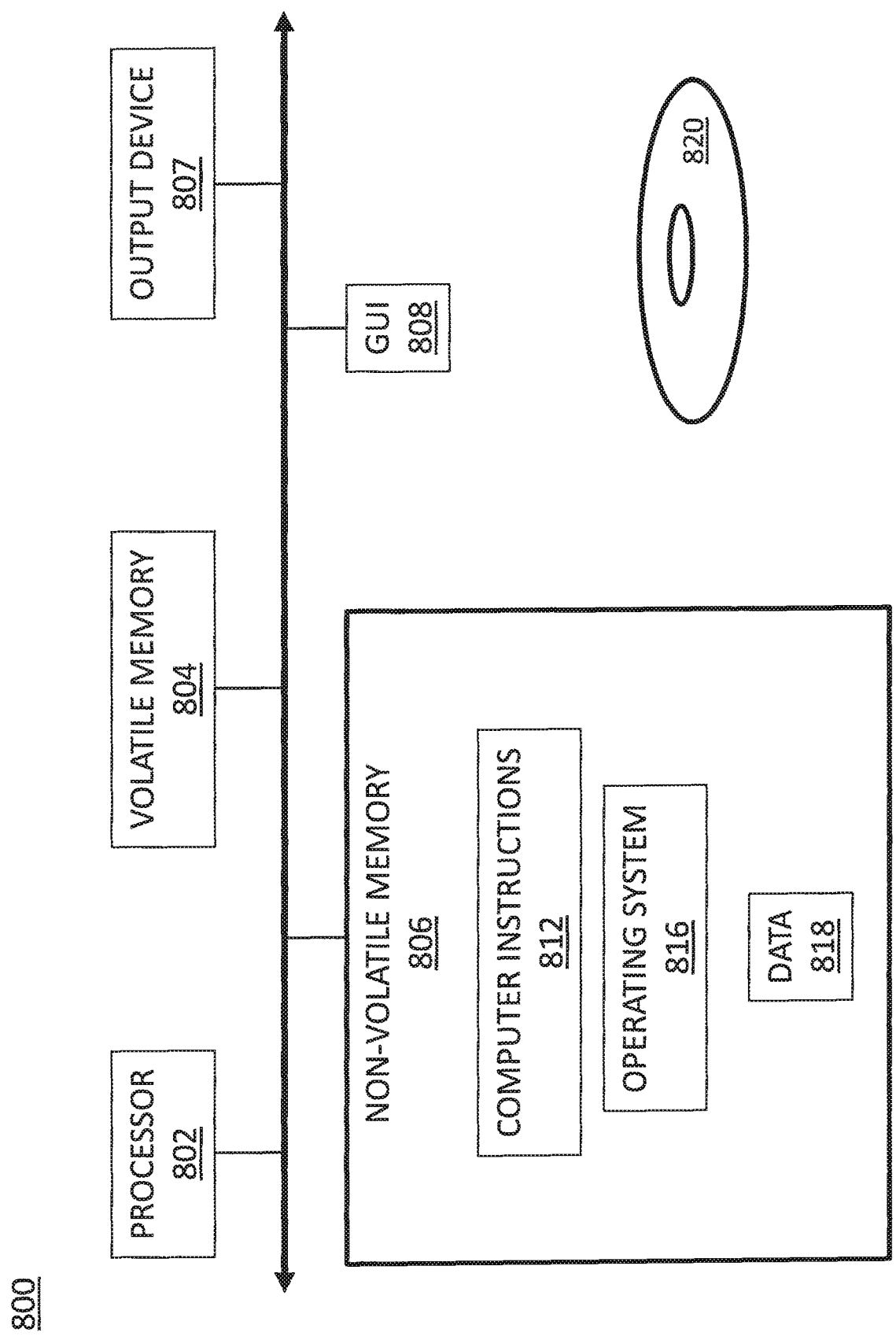
FIG. 8 is a diagram of an example of a computing device according to embodiments.

FIG. 8 shows an exemplary computer 800 (e.g., physical or virtual) that can perform at least part of the processing described herein. The computer 800 includes a processor 802, a volatile memory 804, a non-volatile memory 806 (e.g., hard disk or flash), an output device 807 and a graphical user interface (GUI) 808 (e.g., a mouse, a keyboard, a display, for example). The non-volatile memory 806 stores computer instructions 812, an operating system 816 and data 818. In one example, the computer instructions 812 are executed by the processor 802 out of volatile memory 804. In one embodiment, an article 820 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to the disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

The invention claimed is:

1. A method for performance optimization in a storage system, the method comprising:
providing a metadata structure that defines a storage space of the storage system;
for each of a plurality of storage objects in the storage system:
monitoring input/output (IO) patterns for IO operations conducted at the storage system;
monitoring deduplication characteristics of the storage object; and
configuring local mapping layer parameters; and
modifying local object metadata in the metadata structure based on results of the monitoring and the configuring, wherein the metadata structure includes a tree structure, and modifying the local object metadata includes reducing a count of pointers in one or more leaves of the tree structure.

2. The method of claim 1, wherein the metadata structure includes nodes that point to respective virtual logical address nodes, and the virtual logical address nodes point to physical storage nodes for the storage objects residing in the storage system.

3. The method of claim 1, wherein the IO patterns for the IO operations include at least one of read operations, write operations, block sizes, data duplication sizes and alignments.

4. The method of claim 1, wherein the local mapping layer parameters include at least one of an optimal block size, an object alignment at a selected granularity, and a dedupe operation at a selected granularity.

5. The method of claim 1, wherein the configuring is performed in the background with respect to activities conducted at the storage system.

6. The method of claim 1, wherein the configuring includes reducing a size of the metadata structure.

7. The method of claim 1, wherein the metadata structure is a multi-level data structure including a top-level node and mid-level nodes, wherein the nodes pointing to respective virtual logical address nodes are leaf nodes, and the mid-level nodes point to the leaf nodes.

8. The method of claim 7, wherein the configuring includes reducing a number of the leaf nodes in the multi-level metadata structure.

9. A system for performance optimization in a storage system, the system comprising:
a memory comprising computer-executable instructions; and
a processor executing the computer-executable instructions, the computer-executable instructions when executed by the processor cause the processor to perform operations comprising:
providing a metadata structure that defines a storage space of the storage system;
for each of a plurality of storage objects in the storage system:
monitoring input/output (IO) patterns for IO operations conducted at the storage system;
monitoring deduplication characteristics of the storage object; and
configuring local mapping layer parameters; and
modifying local object metadata in the metadata structure based on results of the monitoring and the configuring, wherein the metadata structure includes a tree structure, and modifying the local object metadata includes reducing a count of pointers in one or more leaves of the tree structure.

10. The system of claim 9, wherein the metadata structure includes nodes that point to respective virtual logical address nodes, and the virtual logical address nodes point to physical storage nodes for the storage objects residing in the storage system.

11. The system of claim 9, wherein the IO patterns for the IO operations include at least one of read operations, write operations, block sizes, data deduplication sizes, and alignments.

12. The system of claim 9, wherein the local mapping layer parameters include at least one of an optimal block size, an object alignment at a selected granularity, and a dedupe operation at a selected granularity.

13. The system of claim 9, wherein the configuring is performed in the background with respect to activities conducted at the storage system.

14. The system of claim 9, wherein the configuring includes reducing a size of the metadata structure.

15. The system of claim 9, wherein the metadata structure is a multi-level data structure including a top-level node and mid-level nodes, wherein the nodes pointing to respective virtual logical address nodes are leaf nodes, and the mid-level nodes point to the leaf nodes.

16. The system of claim 15, wherein the configuring includes reducing a number of the leaf nodes in the multi-level metadata structure.

17. A computer program product for performance optimization in a storage system, the computer program product embodied on a non-transitory computer readable medium, and the computer program product including instructions that, when executed by a computer, causes the computer to perform operations. The operations include:
providing a metadata structure that defines a storage space of the storage system;
for each of a plurality of storage objects in the storage system:
monitoring input/output (IO) patterns for IO operations conducted at the storage system;
monitoring deduplication characteristics of the storage object; and
configuring local mapping layer parameters; and
modifying local object metadata in the metadata structure based on results of the monitoring and the configuring, wherein the metadata structure includes a tree structure, and modifying the local object metadata includes reducing a count of pointers in one or more leaves of the tree structure.

18. The computer program product of claim 17, wherein the metadata structure includes nodes that point to respective virtual logical address nodes, and the virtual logical address nodes point to physical storage nodes for the storage objects residing in the storage system.

19. The computer program product of claim 17, wherein the IO patterns for the IO operations include at least one of read operations, write operations, block sizes, and alignments.

20. The computer program product of claim 17, wherein the local mapping layer parameters include at least one of an optimal block size, an object alignment at a selected granularity, and a dedupe operation at a selected granularity.

* * * * *